3,146,068
PREPARATION OF SULFURYL FLUORIDE
John Richard Soulen, Philadelphia, Pa., assignor to Pennsalt Chemicals Corporation, Philadelphia, Pa., a corporation of Pennsylvania
No Drawing. Filed Feb. 23, 1962, Ser. No. 175,321
6 Claims. (Cl. 23—203)

This invention relates to an improved process for the preparation of sulfuryl fluoride, which compound is an important intermediate to fluorocarbon compounds and also has important insecticidal properties.

It is known in the art to prepare sulfuryl fluoride ($SO_2F_2$) in good yields either by the reaction of $SO_2$ with elemental fluorine, or by the pyrolysis of barium fluorosulfonate [$Ba(SO_3F)_2$], (Fluorine Chemistry, vol. 1, J. H. Simons, editor, 1950, p. 94). Unfortunately, these processes require expensive and difficult-to-handle starting materials. It would be desirable to obtain sulfuryl fluoride from a low cost, readily available fluorine compound such as fluorspar which is predominately calcium fluoride. Although there have been attempts to make $SO_2F_2$ in appreciable yields from calcium fluoride, a successful simple process has not been achieved.

Coffman and Muetterties report in J.A.C.S. 80:5914 (1958) that strontium and barium fluorosulfonates may be pyrolyzed in vacuo to sulfuryl fluoride. The calcium compound, however, is said to reversibly dissociate to $CaF_2$ and $SO_3$, and only trace to 1% conversions to sulfuryl fluoride could be obtained. A 4% yield was obtained in one run, but this could not be duplicated in 19 other trials. Variations in reaction times, pyrolysis procedures, preparative method for $Ca(SO_3F)_2$, and additions of iron and nickel fluorides to the fluorosulfonate or addition of HCl to the gas stream were unsuccessful in increasing the $SO_2F_2$ yield. In another, but more complicated, technique, significant yields of sulfuryl fluoride may be obtained from calcium fluoride by a two step procedure which combines the disclosures of Muetterties in U.S. Patents 2,801,904 and 2,879,138. In this technique, pyrosulfuryl fluoride is first formed by heating a molar excess of sulfur trioxide with calcium fluoride (4 to 9 moles of $SO_3$ per 1 mole of $CaF_2$) and treating the heated reaction mass with strong sulfuric acid to isolate the pyrosulfuryl fluoride. Then, the isolated pyrosulfuryl fluoride is subjected to a separate pyrolysis step whereby sulfuryl fluoride and/or thionyl fluoride is obtained as product. Obviously, a more direct procedure for sulfuryl fluoride is desirable.

It has been found that by means of this invention, calcium fluoride can now be used as a source of sulfuryl fluoride and that the desired sulfuryl fluoride can be formed readily in good yields. This is accomplished by the process of this invention whereby reaction products of calcium fluoride and $SO_3$ having the empirical formula $Ca(SO_3F)_xF_{2-x}$ where $x$ is a digit from one to two are pyrolyzed under pressure conditions to obtain the desired sulfuryl fluoride. In view of the teachings of the prior art pointed out above, whereby calcium fluorosulfonate (i.e., $Ca(SO_3F)_2$) is reversibly dissociated to $CaF_2$ and $SO_3$ under pyrolysis conditions, it is indeed unexpected that a significant amount of sulfuryl fluoride is obtained by the process of this invention.

In a preferred procedure, calcium fluorosulfonate is prepared in situ from calcium fluoride and $SO_3$ and without isolation is pyrolyzed under autogenous pressure to sulfuryl fluoride. Preferably, the source of calcium fluoride is fluorspar which consists of over 95% by weight of calcium fluoride, although, of course, pure calcium fluoride may be used. The calcium fluoride and liquid $SO_3$ are simply introduced into a reaction chamber capable of withstanding high pressure and after closing the chamber the temperature is brought to about 200° to 300° C. and held for several hours. No special equipment or special procedural steps are required, but, of course, the equipment used will be selected to resist the corrosive effects of $SO_3$. Stainless steel, nickel, or nickel aloys are suitable materials of construction for the reaction vessel.

After this first phase of the process is completed, whereby calcium fluorosulfonate is formed, the pyrolysis step is simply carried out by increasing the temperature to about 600° to 800° C. and this temperature is maintained for 0.5 to 2 hours to ensure completion of the reaction. The autogenous pressure generated at these high temperatures is usually on the order of 500 to 2000 p.s.i.g. The vessel may be cooled to room temperature before it is opened and the volatile products distilled into a suitable container (e.g., a strainless steel cylinder) for storage and subsequent use, or the product may be bled from the reaction vessel at reaction temperature conditons.

Mole ratios of reactants are not significant because stoichiometric amounts will enter into the reaction. However, from one to two moles of $SO_3$ per mole of $CaF_2$ will usually be employed. It will be understood that the process may be carried out by raising the temperature from the starting room temperature to the pyrolysis temperature at a constant rate and that distinct temperatures steps are not necessary. As the temperature increases, the calcium fluorosulfonate is first formed and subsequently pyrolyzed when the higher temperatures are reached.

Instead of preparing the calcium fluorosulfonate in situ, calcium fluorosulfonate from any source may be pyrolyzed under autogenous pressure conditions to yield sulfuryl fluoride in good yields. Likewise, reaction products of calcium fluoride and $SO_3$ corresponding to the empirical formula $Ca(SO_3F)F$ may be pyrolyzed either directly or formed in situ prior to pyrolysis. This latter product is formed by reaction of equimolar amounts of calcium fluoride and $SO_3$.

The following examples will serve to further illustrate the invention:

Example 1

58.5 g. fluorspar (about 0.75 mole $CaF_2$) and 59.9 g. (about 0.75 mole) $SO_3$ were charged into a 300 ml. stainless steel autoclave and heated at 260° C. for 11 hours. $CaF_2$ and $SO_3$ react to form $Ca(SO_3F)F$ under these conditions. The temperature was then raised to about 730° C., after which the bomb was allowed to cool slowly. At room temperature the bomb pressure was 207 p.s.i.g., and 18.2 g. of volatile product was transferred to a liquid nitrogen cooled stainless steel cylinder. Infrared and gas chromatographic analyses of this product showed the gas to have the following analysis:

|  | Mole percent |
|---|---|
| $SO_2F_2$ | 87.7 |
| $SO_2$ | 6.7 |
| $SiF_4$, $CO_2$ | 2.8 |
| Air | 2.6 |
| Unknown | 0.2 |

Example 2

39.5 g. fluorspar (about 0.5 mole $CaF_2$) and 78.6 g. (about 1 mole) $SO_3$ were placed in a 300 ml. Inconel autoclave and heated to 260° C. for 9½ hours whereby $Ca(SO_3F)_2$ is obtained. The temperature was then raised to 725–745° C. and held for two hours. The bomb pressure rose to over 600 p.s.i.g. and, during this two hour period, product was bled off in several steps into a liquid nitrogen cooled cylinder. A total of 27.5 g. of volatile product was collected. The fraction of this which was gaseous at room temperature had a pressure of 160 p.s.i.g. and by infrared and gas chromatographic analyses was shown to contain:

| | Mole percent |
|---|---|
| $SO_2F_2$ | 98.4 |
| $SiF_4$ | 1.3 |
| $SO_3$ | 0.3 |

The weight of product gaseous at room temperature was found by bleeding the content of the collection cylinder through a tower containing $H_2SO_4$ and collecting it in a second cylinder cooled in liquid nitrogen. 15.6 g. were collected in this manner.

*Example 3*

If instead of preparing $Ca(SO_3F)_2$ in situ as in Example 2, $Ca(SO_3F)_2$ is placed in the pressure vessel and pyrolyzed at about 720°–750° C. under autogenous pressure, sulfuryl fluoride is likewise obtained.

It will be understood that numerous variations and changes may be made from the above description and examples without departing from the spirit and scope of the invention. For example, instead of using autogenous pressure conditions, the system may be pressured with an inert gas to pressures above autogenous, or by bleeding the reaction products, pressures lower than autogenous may be used. Generally, the process will be operated at pressures between about 500 and 2000 p.s.i.g. Instead of using a batch process, a continuous procedure may be employed. Other variations will be obvious to those skilled in the art.

I claim:

1. A process for the preparation of sulfuryl fluoride free of thionyl fluoride and without the formation of pyrosulfuryl fluoride which comprises pyrolyzing at a temperature between about 600° and 800° C. and at a pressure between about 500 to 2000 p.s.i.g. a composition having the empirical formula $Ca(SO_3F)_xF_{2-x}$ where $x$ is digit from one to two.

2. The process of claim 1 wherein calcium fluorosulfonate is pyrolyzed to sulfuryl fluoride.

3. The process of claim 1 wherein a composition corresponding to the formula $Ca(SO_3F)F$ is pyrolyzed to sulfuryl fluoride.

4. A process for the preparation of sulfuryl fluoride free of thionyl fluoride and without the formation of pyrosulfuryl fluoride which comprises reacting one mole of calcium fluoride with one to two moles of sulfur trioxide in a closed system to form a composition having the structure $Ca(SO_3F)_xF_{2-x}$ where $x$ is a digit from one to two and, without isolation, pyrolyzing said composition to sulfuryl fluoride at a temperature between about 600° and 800° C. and at a pressure between about 500 and 2000 p.s.i.g.

5. A process for the preparation of sulfuryl fluoride free of thionyl fluoride and without the formation of pyrosulfuryl fluoride which comprises heating 1 mole of calcium fluoride with about two moles of sulfur trioxide in a closed system at a temperature between about 150° and 300° C. to form calcium fluorosulfonate and then, without isolation, pyrolyzing said calcium fluorosulfonate at a temperature between about 600° and 800° C. and at a pressure between about 500 and 2000 p.s.i.g. to obtain sulfuryl fluoride.

6. The process of heating 2 moles of sulfur trioxide with one mole of calcium fluoride in a closed system at a temperature between about 150° and 300° C. and thereafter raising the temperature to a temperature between about 600° and 800° C. whereby the calcium fluorosulfonate formed at the lower temperature is pyrolyzed to sulfuryl fluoride without the formation of thionyl fluoride and pyrosulfuryl fluoride.

References Cited in the file of this patent

UNITED STATES PATENTS

| 2,801,904 | Muetterties | Aug. 6, 1957 |
| 2,879,138 | Muetterties | Mar. 24, 1959 |

OTHER REFERENCES

Hayek et al.: "Preparation and Decomposition of Fluorosulfonates," Chemical Abstracts, 1957, col. 6418d.

Lange: "The Chemistry of the Fluoro Acids, of Fourth, Fifth and Sixth Group Elements," Fluorine Chemistry, vol. 1. Edited by J. H. Simons, page 173.

Muetterties et al.: "Chemistry of Some Oxyfluorides," pp. 5914–5918, JACS, vol. 80, 1958.